(12) United States Patent
Miyao et al.

(10) Patent No.: US 6,799,142 B2
(45) Date of Patent: Sep. 28, 2004

(54) MEASURING DEVICE

(75) Inventors: Yoshikatsu Miyao, Tokyo-to (JP); Masaaki Kobayashi, Tokyo-to (JP); Masaki Takanashi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 10/180,263

(22) Filed: Jun. 26, 2002

(65) Prior Publication Data

US 2003/0009310 A1 Jan. 9, 2003

(30) Foreign Application Priority Data

Jul. 9, 2001 (JP) ........................................ 2001-208088

(51) Int. Cl.$^7$ ................................................. G01B 5/02
(52) U.S. Cl. ..................................................... 702/159
(58) Field of Search ................................ 702/159, 150; 711/154, 103, 165, 170, 163, 164, 202; 455/426, 67; 244/3.2, 3; 299/17; 342/357; 717/170; 705/51; 395/712; 399/21

(56) References Cited

U.S. PATENT DOCUMENTS

| | | | | |
|---|---|---|---|---|
| 5,752,040 A | * | 5/1998 | Kaneko et al. | ............. 717/170 |
| 2002/0002652 A1 | * | 1/2002 | Takahashi | .................... 711/103 |
| 2003/0041217 A1 | * | 2/2003 | Terada et al. | ................ 711/154 |

FOREIGN PATENT DOCUMENTS

JP 10-10931 * 1/1998 .......... G03G/21/00

* cited by examiner

Primary Examiner—John Barlow
Assistant Examiner—Tung S Lau
(74) Attorney, Agent, or Firm—Nields & Lemack

(57) ABSTRACT

A measuring device, comprising a program for operating the measuring device, a copying program for rewriting the program or for copying the program, a rewritable first storage means for storing the program, a signal input/output means, and a second storage means for storing the copying program, wherein the program stored in the first storage means is rewritten by a new program inputted through the signal input/output means.

3 Claims, 4 Drawing Sheets

1

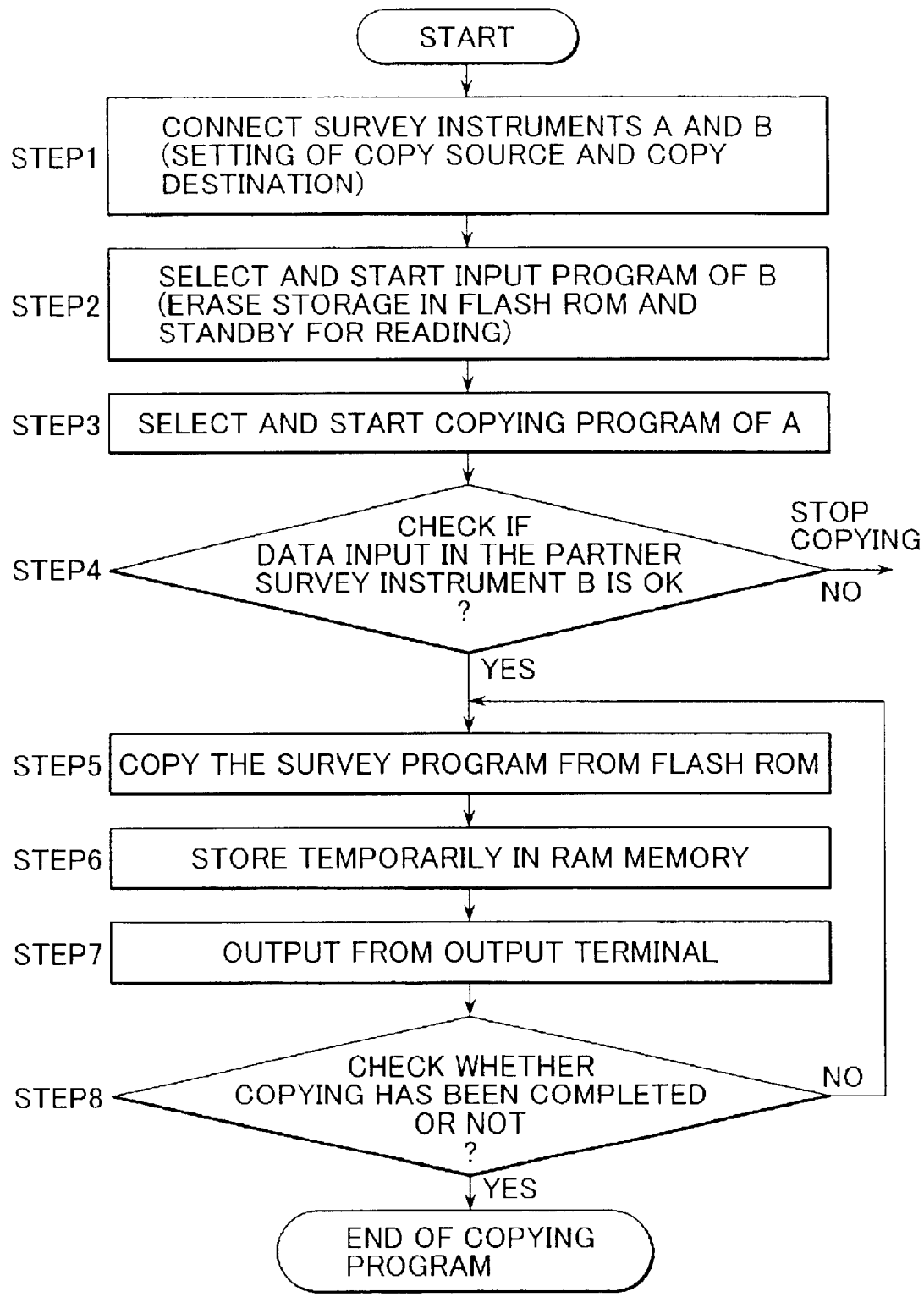

MEASURING DEVICE

BACKGROUND OF THE INVENTION

The present invention relates to a measuring device, which comprises functions to display or store measured values and further to display guidance information for operation.

In recent years, a mechanical type survey instrument only for performing surveying operation at predetermined points has been used less frequently. Instead of this, an electronic survey instrument is becoming the main stream in this field. The electronic survey instrument is provided with special programs so that the electronic survey instrument can display or store measured values, so that it can display guidance information for operation to facilitate easily execution of a complicated surveying procedure or so that it can simplify the measuring procedure by inputting predetermined measuring conditions.

The programs include a basic program and an application program. The basic program comprises a program for converting a signal from a distance measuring unit to a distance, a program for converting a signal from an encoder to an angle, and a program for displaying surveyed values on a display unit. The application program calculates or stores the measured values by a procedure according to the surveying operation. There are various types of the application programs depending on the type of surveying, and the application program is installed by electronic medium such as memory card or is stored in advance in a built-in storage unit.

In a card type survey instrument, because the programs can be customized, it is often used in a total station, which is a high-grade electronic survey instrument.

In a built-in type electronic survey instrument where a general surveying procedure is stored in advance, the basic program and the application program are recorded in a ROM mounted in a circuit substrate.

Incidentally, unlike a simple mechanical type survey instrument, the electronic survey instrument is operated according to the programs. New functions can be added, program bug can be repaired, or version of the program can be updated.

In the card type electronic survey instrument, the programs stored in a card may be rewritten for the purpose of repairing program bug or of updating the program version, etc. However, the basic program is incorporated in the survey instrument, and a cover of the instrument must be opened for the purpose of rewriting. In the electronic survey instrument with programs incorporated in it, both the application program and the basic program are incorporated in the instrument. When it is wanted to update the version of the program, a cover of a main unit must be opened, and ROM inserted in the circuit substrate must be replaced.

When a program bug is repaired or the version of the program is updated, if it is a card type survey instrument, the procedure is simple and can be carried out at the distributors or at the survey companies which have a plenty of survey instruments. This can be carried out by replacing the memory card and by rewriting the contents of the memory card using a computer.

However, as far as it is concerned with the incorporated components or in case of a built-in type electronic survey instrument, the cover of the main unit must be opened for such procedure. In recent years, program type survey instruments are becoming the main stream. In this respect, the program version must be updated more frequently. As described above, in case of the incorporated components or the built-in type survey instrument, such procedure can be dealt with by replacing storage components such as ROM. However, dust or dirt may be entrained and it requires complicated procedure. Also, replacing of expensive ROMs means higher cost. When it is necessary to perform this procedure on a great number of survey instruments, many ROM rewriting devices are required, and this is very difficult to accomplish.

SUMMARY OF THE INVENTION

It is an object of the present invention to provide a measuring instrument, by which it is possible to easily rewrite the content of the program in an electronic survey instrument incorporated with survey programs, to simplify the operating procedure, and to reduce the cost.

To attain the above object, the measuring device according to the present invention comprises a program for operating the measuring device, a copying program for rewriting the program or for copying the program, a rewritable first storage means for storing the program, a signal input/output means, and a second storage means for storing the copying program, wherein the program stored in the first storage means is rewritten through a new program inputted through the signal input/output means. Also, the present invention provides the measuring device as described above, wherein a program stored in the first storage means is copied by the copying program and is outputted through the signal input/output means. Further, the present invention provides the measuring device as described above, wherein the program can be rewritten from a measuring device to another measuring device by operating the copying program of the measuring device provided with the copying program. Also, the present invention provides the measuring device as described above, wherein a plurality of measuring devices can be connected via the signal input/output means, and by operating the copying program, the program stored in the first storage means of a measuring device on an input side can be rewritten by a new program stored in a measuring device on an output side. Further, the present invention provides the measuring device as described above, wherein the signal input/output means is provided with a wireless transmitter/receiver for inputting and outputting a data signal by wireless. Also, a measuring device, comprising a program for operating the measuring device, a copying program for rewriting the program or for copying the program, a rewritable first storage means for storing the program, a signal input/output means, and a second storage means for storing the copying program, wherein the second storage means further comprises a transfer program for inputting and outputting a program to be rewritten or a program to be copied as a data signal through the input/output means. Further, the present invention provides the measuring device as described above, wherein the program stored in the rewritable first storage means is a survey program, the measuring device has a distance measuring and angle measuring function, and the distance measuring and angle measuring function is performed based on the survey program.

BRIEF DESCRIPTION OF THE DRAWINGS

FIG. 4 is a flow chart to show copying operation of survey programs between the electronic survey instruments.

DETAILED DESCRIPTION OF THE PREFERRED EMBODIMENT

Figure 1:
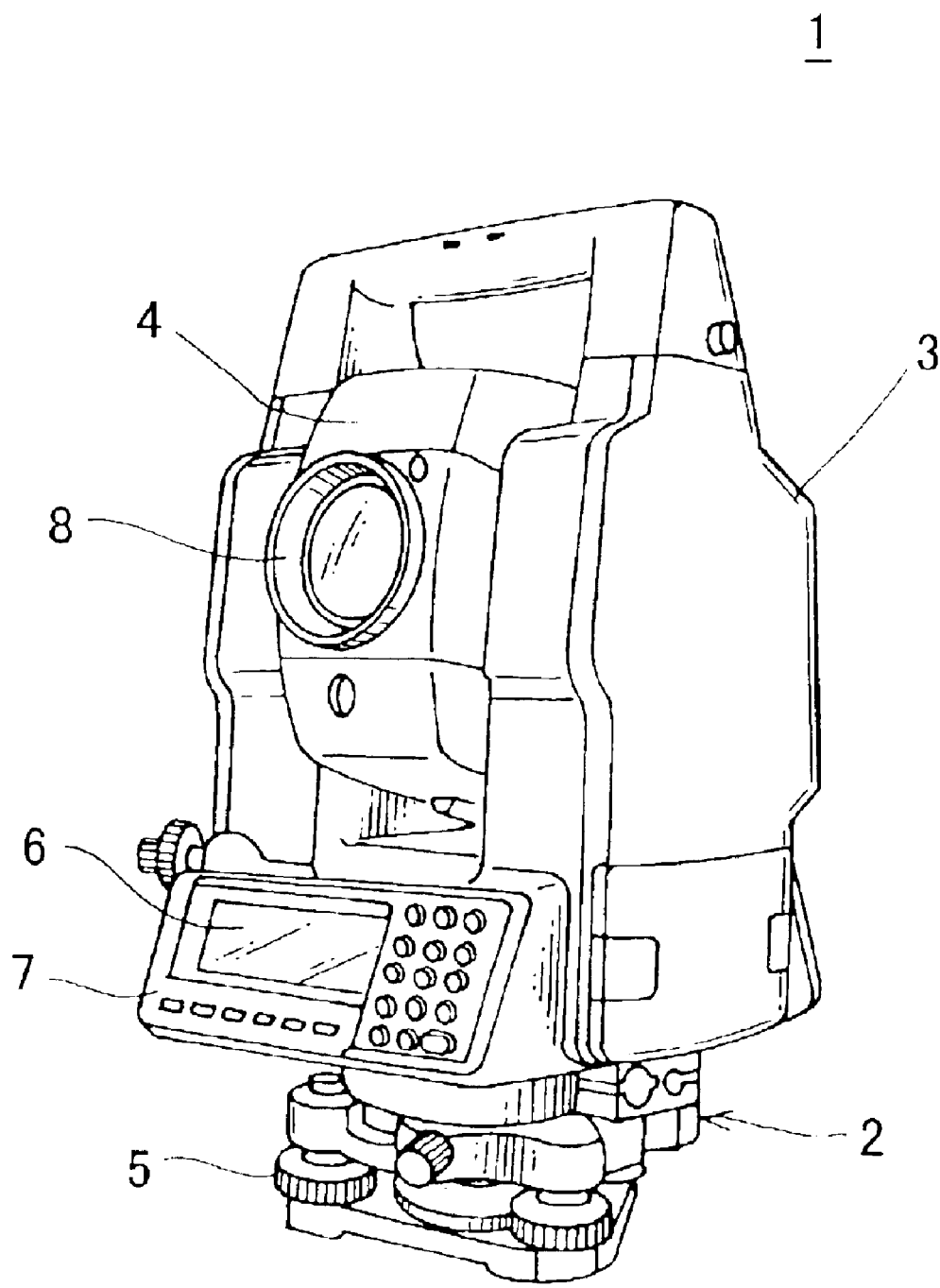
FIG. 1 is an external view of an electronic survey instrument according to an embodiment of the present invention.

Description will be given below on an embodiment of the present invention according to an electronic survey instrument referring to the drawings.

First, description will be given on general features of the electronic survey instrument referring to FIG. 1.

An electronic survey instrument 1 mainly comprises a base unit 2 fixed on a tripod (not shown), a frame unit 3 rotatable around a vertical axis and mounted on the base unit 2, and a body tube 4 tiltable around a horizontal axis and mounted on the frame unit 3.

Leveling screws 5 are provided on the base unit 2, and leveling operation of the electronic survey instrument 1 can be performed by adjusting the leveling screws 5. A control unit 10 (to be described later) is provided on the frame unit 3, and a display unit 6 and an operation/input unit 7 are further provided. On the tube body 4, a telescope 8 is mounted.

Figure 2:
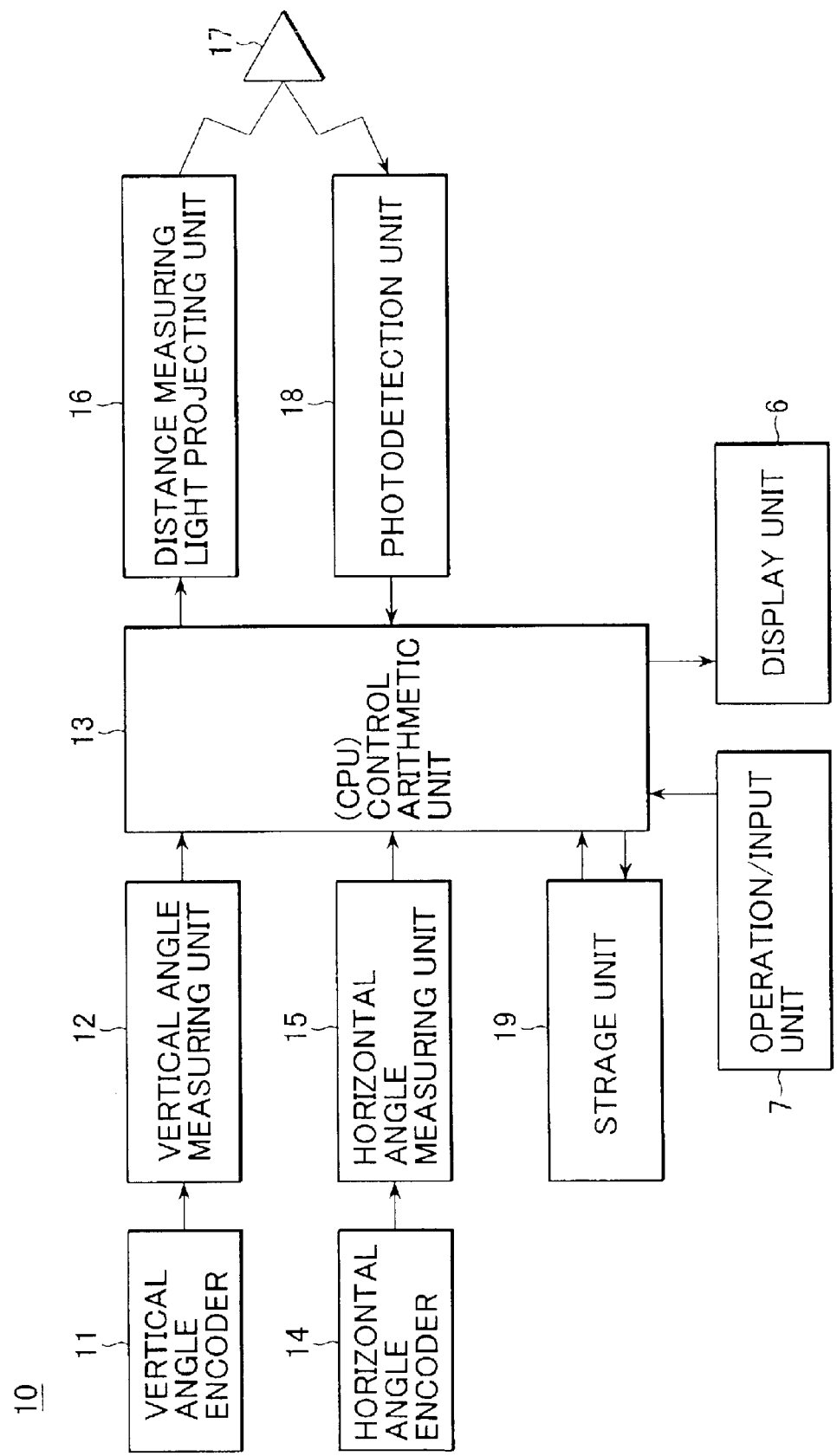
FIG. 2 is a block diagram of the electronic survey instrument.

Now, description will be given on the control unit 10 referring to FIG. 2.

A vertical angle encoder 11 is mounted on a rotator of the body tube 4. A detection signal from the vertical angle encoder 11 is inputted to a vertical angle measuring unit 12. Based on the signal from the vertical angle encoder 11, the vertical angle measuring unit 12 calculates a tilt angle of the body tube 4, and the result of calculation is inputted to a control arithmetic unit 13.

A horizontal angle encoder 14 is mounted on a rotator of the frame unit 3. A signal from the horizontal angle encoder 14 is inputted to a horizontal angle measuring unit 15. The horizontal angle measuring unit 15 counts or stores the signal from the horizontal angle encoder 14. The result is inputted to the control arithmetic unit 13, and a horizontal angle is calculated. Based on a program, the control arithmetic unit 13 calculates a measuring distance and a measuring angle and controls the electronic survey instrument 1 in operation such as display operation. A storage unit 19 connected to the control arithmetic unit 13 comprises semiconductor storage means such as ROM, RAM, flash ROM, etc. Measured values are stored, and a basic program and an application program are stored. The storage unit 19 is mounted in advance on a wiring substrate (not shown) of the control arithmetic unit 13.

The control arithmetic unit 13 drives and controls a distance measuring light projecting unit 16. The distance measuring light projecting unit 16 projects a distance measuring light to an object 17. The distance measuring light thus projected is reflected by the object 17. The reflected distance measuring light is detected by a photodetection unit 18. A detection signal is inputted to the control arithmetic unit 13, and the distance is calculated.

The display unit 6 and the operation/input unit 7 are connected to the control arithmetic unit 13.

Description will be given below on measuring operation in the electronic survey instrument 1.

The object 17 is arranged at a predetermined position such as a known point, a measuring point, etc. Conditions for measurement, etc. are inputted by the operation/input unit 7, and the data thus inputted are displayed on the display unit 6. Or, based on the conditions thus inputted, the control arithmetic unit 13 displays guidance information display such as information on a measuring procedure on the display unit 6. Following the guidance information display, a measuring operator inputs starting of measurement, and the measuring operation is started.

The distance measuring light is projected from the distance measuring light projecting unit 16. The distance measuring light reflected by the object 17 is received by the photodetection unit 18. The result of the photodetection is inputted to the control arithmetic unit 13, and the distance to the object 17 is calculated. A vertical angle with respect to the object 17 is inputted to the control arithmetic unit 13 from the vertical angle measuring unit 12. In this case, a horizontal angle is also inputted to the control arithmetic unit 13 from the horizontal angle measuring unit 15.

The distance measurement result, the vertical angle, and the horizontal angle are displayed on the display unit 6. When necessary, process of measurement is displayed on the display unit 6.

The display of the inputted data on the display unit 6, or the displays of the guidance information for measurement, the measurement result and the measurement process, etc. are performed in accordance with a program stored in advance in the storage unit 19.

The present embodiment is provided with a function to rewrite the program stored in the storage unit 19.

Figure 3:
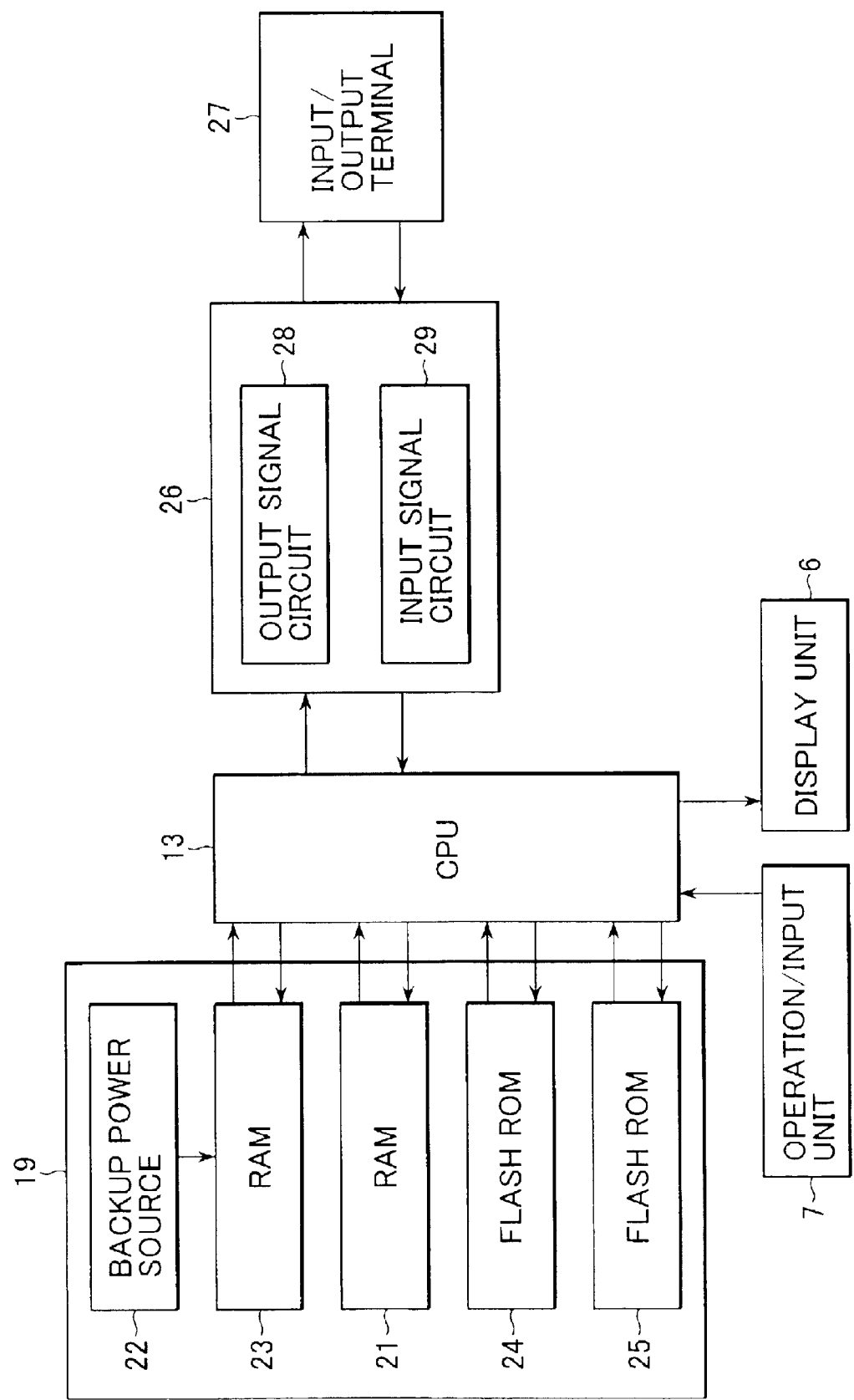
FIG. 3 is a block diagram of a storage unit of the electronic survey instrument.

Now, description will be given referring to FIG. 3.

The storage unit 19 comprises a first RAM 21, a second RAM 23, to which a backup power source 22 is connected, a flash ROM 24, and a flash ROM 25.

The first RAM 21 is a storage means for temporarily storing the data, the program or the calculation result, etc. and the data are stored so far as power is connected. The second RAM 23 stores data such as setting values required for operating the electronic survey instrument 1, correction value necessary for calculation, etc. The stored data are maintained by the backup power source 22.

The flash ROM 24 maintains the stored data without supply of power. The flash ROM 24 stores a copying program for copying survey data and for copying the program, a transfer program for transferring the copied data, and a writing program for writing the data transferred from outside to the flash ROM 25. These programs are not rewritable.

The flash ROM 25 maintains the stored data without supply of power. The flash ROM 25 stores a basic control program necessary for operation of hardware in the electronic survey instrument 1, e.g. a program for calculating the vertical angle or the horizontal angle based on a signal from the vertical angle measuring unit 12 or the horizontal angle measuring unit 15, and a program for projecting the distance measuring light from the distance measuring light projecting unit 16, and for receiving the reflected light and for capturing the photodetection signal and for calculating the distance. Also, a survey program, e.g. a survey sequence program for automatically performing the survey operation, and a display program for displaying the survey result, and the process of survey in various modes on the display unit 6 are stored. These programs are rewritable for the purpose of updating the program version, or of repairing program bug. In most cases, the flash ROM 25 is divided to the flash ROM for the basic program and the flash ROM for the application program.

An input/output means 26 is connected to the control arithmetic unit 13. The input/output means 26 comprises an output signal processing circuit 28 for converting data such as the programs stored in the flash ROM 25 to a form of signal, which can be outputted to outside such as series of signals, and an input signal processing circuit 29 for converting the series of data inputted from outside to a form of signals to be processed at the control arithmetic unit 13.

To the input/output means 26, an input/output terminal 27, e.g. a 232C terminal, is connected, and an external device, e.g. other electronic survey instrument, can be connected via the input/output terminal 27.

Because there is provided the input/output terminal connected to the other electronic survey instrument and the copying program is incorporated, it is possible to connect to the other electronic survey instrument via the input/output terminal 27 and to transfer the data from one electronic survey instrument to the other electronic survey instrument. The copying program is started by the operation/input unit 7. Also, by the operation from the operation/input unit 7, an old program stored in the flash ROM 25 can be erased and a new program can be rewritten.

In so doing, even when there is no ROM rewriting device, the program can be transferred from the electronic survey instrument where a survey program of new version is stored to the other electronic survey instrument and the program can be rewritten.

Also, it is possible to rewrite the stored survey program without replacing the flash ROM 25 in the electronic survey instrument.

Referring to FIG. 4, description will be given now on copying of a survey program from an electronic survey instrument to another electronic survey instrument. Here, it is supposed that a copy source electronic survey instrument is A, and a copy destination electronic survey instrument is B.

Step 01: The electronic survey instrument A is connected to the electronic survey instrument B via the input/output terminal 27 by a cable. When copying is made between the electronic survey instruments each other, for the purpose of preventing rewriting of a survey program of new version to a survey program of old version, the copy source and the copy destination are set by a selector switch, which is used to differentiate the copy source from the copy destination or by a selector switch, which validates only one of the transferred program and the rewritten program. The selector switch may be a mechanical switch or a software-oriented switch.

Step 02: By starting the rewritten program of the electronic survey instrument B, the contents stored in the flash ROM 25 is erased, and it is turned to the rewrite standby status.

Step 03: The copying program of the electronic survey instrument A is selected and started. Step 04: It is checked whether the electronic survey instrument B is ready for data input. If the result of the checking is acceptable (OK), the transfer program is automatically started, and the copying data is transferred to the electronic survey instrument B. If the result of the checking is not acceptable (NO), the copying is stopped. It is displayed on the display unit 6 whether the copying operation has been completed or not. To complete the copying operation, the procedure should be repeated from Step 01 again.

Step 05: The survey program of the electronic survey instrument A is read.

Step 06: The survey program thus read is temporarily stored in the first RAM 21.

Step 07: The survey program of the first RAM 21 is converted to data for sequential delivery by the output signal processing circuit 28. The data are then outputted via the input/output terminal 27 and are transferred to the electronic survey instrument B. The data transferred via the input/output terminal 27 and the input signal processing circuit 29 of the electronic survey instrument B are incorporated, and the data are converted at the input signal processing circuit 29 and are written in the flash ROM 25.

Step 08: It is checked whether the copying operation has been normally completed or not. If copying is not completed, the procedure is returned to Step 05, and copying operation is further continued. If copying has been normally completed, the completion of copying is displayed on the display unit 6 as soon as the copying program has been completed.

In the above embodiment, the data are transferred via the cable, while it may be designed in such manner that a wireless transmitter/receiver is provided in the electronic survey instruments, and the data may be transmitted and received by wireless.

When the electronic survey instruments are connected with each other via the cable, it may be designed in such manner that a plurality of electronic survey instruments are connected in series so that survey programs of a plurality of electronic survey instruments can be rewritten at the same time. In case of a wireless system, if one survey instrument is assigned as the copy source survey instrument, a plurality of electronic survey instruments can receive the data at the same time. Then, it is possible to rewrite the survey programs of a plurality of electronic survey instruments at the same time. By repeating copying, programs of many electronic survey instruments can be rewritten easily.

In the above, description has been given on the electronic survey instrument. Programs can be rewritten easily in similar manner so far as it is a measuring device provided with programs and operated according to such programs.

According to the present invention, a measuring device comprises a program for operating the measuring device, a copying program for rewriting the program or for copying the program, a rewritable first storage means for storing the program, a signal input/output means, and a second storage means for storing the copying program, wherein the program stored in the first storage means is rewritten by a new program inputted through the signal input/output means. Thus, without replacing the storage unit such as ROM in the electronic survey instrument, it is possible to easily rewrite the contents of the stored program. This contributes to the simplification of operating procedure and to the reduction of cost.

What is claimed is:

1. An electronic survey instrument, comprising a storage unit for storing a program necessary for operating said first electronic survey instrument and an input/output means, wherein said storage unit has a rewritable first storage means for storing a basic program and a second storage means for storing a program for rewriting contents stored in said first storage means, wherein said program has a copy program for copying the contents stored in said first storage means, a transfer program for transferring the copied contents stored in said first storage means and a writing program for writing the transferred contents stored in said first storage means, and wherein said input/output means can transfer said contents stored in said first storage means to another electronic survey instrument, wherein two or more electronic survey instruments which comprise said programs are connected in series, and the programs in said first storage means of said two or more electronic survey instruments can be rewritten.

2. An electronic survey instrument according to claim 1, wherein the contents stored in said first storage means are copied by operating said copy program, and the contents stored in said first storage means are transferred to another electronic survey instrument through said input/output means by operating said transfer program.

3. An electronic survey instrument according to claim 1, wherein said electronic survey instrument has a distance measuring and angle measuring function and a display function, and said distance measuring and angle measuring function and said display function are operated based on said program stored in said rewritable first storage means.

* * * * *